(12) United States Patent
Bechtel et al.

(10) Patent No.: US 12,370,953 B2
(45) Date of Patent: Jul. 29, 2025

(54) STOWABLE VEHICLE STEP

(71) Applicant: FCA US LLC, Auburn Hills, MI (US)

(72) Inventors: Travis D Bechtel, Goodrich, MI (US);
Richard T Stuedemann, Ortonville, MI (US); Stacey L Berger, Lapeer, MI (US)

(73) Assignee: FCA US LLC, Auburn Hills, MI (US)

( * ) Notice: Subject to any disclaimer, the term of this patent is extended or adjusted under 35 U.S.C. 154(b) by 351 days.

(21) Appl. No.: 17/991,033

(22) Filed: Nov. 21, 2022

(65) Prior Publication Data

US 2024/0166133 A1  May 23, 2024

(51) Int. Cl.
*B60R 3/02* (2006.01)

(52) U.S. Cl.
CPC ...................... *B60R 3/02* (2013.01)

(58) Field of Classification Search
CPC ........................................................ B60R 3/02
See application file for complete search history.

(56) References Cited

U.S. PATENT DOCUMENTS

| | | | | |
|---|---|---|---|---|
| 6,659,484 B2 * | 12/2003 | Knodle | ............ | B60R 3/02 |
| | | | | 280/166 |
| 6,682,086 B1 * | 1/2004 | Erickson | ............ | B60R 3/02 |
| | | | | 280/166 |
| 6,935,647 B2 * | 8/2005 | Knodle | ............ | B60R 3/02 |
| | | | | 280/166 |
| 7,219,941 B1 | 5/2007 | Paolo et al. | | |
| 7,661,693 B1 * | 2/2010 | Lipski | ............ | B60R 9/06 |
| | | | | 280/166 |
| 7,740,260 B2 | 6/2010 | VanBelle et al. | | |
| 7,823,896 B2 | 11/2010 | VanBelle et al. | | |
| 8,919,853 B2 | 12/2014 | Krishnan et al. | | |
| 9,840,201 B2 * | 12/2017 | Knodle | ............ | B60R 3/007 |
| 2003/0116938 A1 * | 6/2003 | Shields | ............ | B60R 3/007 |
| | | | | 280/166 |
| 2009/0079157 A1 * | 3/2009 | Fratzke | ............ | B60R 3/02 |
| | | | | 280/166 |
| 2021/0086702 A1 | 3/2021 | Christensen et al. | | |
| 2021/0146842 A1 | 5/2021 | Niemela et al. | | |

* cited by examiner

*Primary Examiner* — Bryan A Evans
(74) *Attorney, Agent, or Firm* — Jeremy J. Klobucar

(57) ABSTRACT

In at least some implementations, a movable step for a vehicle includes a base having an upper surface and a mount adapted to be coupled to a vehicle and defining an axis of rotation of the base that is perpendicular to the upper surface of the base. The base rotates about the axis of rotation between an extended position and a retracted position. A retainer has a first position in which the retainer overlaps the base in a path of rotation of the base to prevent rotation of the base from the retracted position to the extended position, and the retainer has a second position in which the retainer does not overlap the base in the path of rotation of the base so that the base is rotatable from the retracted position to the extended position wherein the upper surface is exposed for use as a step.

15 Claims, 4 Drawing Sheets

STOWABLE VEHICLE STEP

FIELD

The present disclosure relates to a step for a vehicle that may be stowed under the vehicle, or a component connected to the vehicle, when not in use.

BACKGROUND

Some vehicles include areas difficult to reach by a person standing on the ground, like a cargo area, roof or the like. When a person attempts to reach such areas, the person may contact the exterior of the vehicle and get dirty or their clothing may scratch the exterior of the vehicle. Further, some people may use a vehicle wheel or another portion of the vehicle as a step to increase their reach, and such areas may be difficult to stand on, and may put the person in contact with the vehicle exterior, as noted.

SUMMARY

In at least some implementations, a movable step for a vehicle includes a base having an upper surface and a mount adapted to be coupled to a vehicle and defining an axis of rotation of the base. The axis of rotation is perpendicular to the upper surface of the base and the base rotates about the axis of rotation between an extended position and a retracted position. A retainer has a first position in which the retainer overlaps the base in a path of rotation of the base to prevent rotation of the base from the retracted position to the extended position, and the retainer has a second position in which the retainer does not overlap the base in the path of rotation of the base so that the base is rotatable from the retracted position to the extended position wherein the upper surface is exposed for use as a step.

In at least some implementations, the step also includes a spring that yieldably biases the base toward the extended position.

In at least some implementations, the retainer includes a link having a pivot about which the link rotates, and the retainer includes a latch that is coupled to the link by a pivot and which has a free end that extends outwardly from the link and into the path of travel of the base when the latch is in a retaining position and which rotates relative to the link and away from the retaining position to a release position to permit the base to rotate to the extended position. In at least some implementations, the latch engages the base between the pivot of the link and the axis of rotation of the base. In at least some implementations, the link is rotated in a first direction and the latch rotates to the release position relative to the link in a second direction opposite to the first direction.

In at least some implementations, a spring biases the latch to the retaining position, and rotation of the link in the first direction while the latch is engaged with the base causes relative rotation between the link and the latch. In at least some implementations, the base rotates in the first direction from the retracted position to the extended position. In at least some implementations, rotation of the link in the second direction about the pivot is limited by engagement of the link with a stop surface, and a spring yieldably biases the link into engagement with the stop surface. In at least some implementations, a second stop surface is engaged by the latch in the retaining position.

In at least some implementations, a vehicle includes a body having a lower surface facing toward and spaced from a surface on which the vehicle is located, and the body includes a mount. A base is connected to the mount to couple the base to the vehicle, the mount defines an axis of rotation of the base about which the base rotates in a path of movement between a retracted position and an extended position, and the base has an upper surface facing away from the surface on which the vehicle is located. A retainer has a link coupled to the vehicle at a first pivot to permit pivoted motion of the link, the retainer includes a latch coupled to the link and movable relative to the link between a retaining position in which the latch overlaps the path of rotation of the base, and the latch has a release position in which the latch does not overlap the path of rotation of the base so that the base is rotatable from the retracted position to the extended position wherein at least part of the upper surface is located outwardly of the lower surface and is not directly between the lower surface and the surface on which the vehicle is located.

In at least some implementations, along a side of the vehicle the vehicle has a front wheel and a rear wheel spaced apart in a fore-aft direction, the base does not overlap the rear wheel in the fore-aft direction when the base is in the retracted position and the base does overlap the rear wheel in the fore-aft direction when the base is in the extended position.

In at least some implementations, the axis of rotation of the base is perpendicular to the surface on which the vehicle is located.

In at least some implementations, the vehicle includes opposite sides spaced apart in a cross-car direction, and wherein the body having the lower surface includes a fixed side step that is connected to and extends outwardly in the cross-car direction from one of the sides of the vehicle, and wherein the base does not extend outwardly in the cross-car direction from the fixed side step when the base is in the retracted position and the base does extend outwardly from the fixed side step in the cross-car direction when the base is in the extended position.

In at least some implementations, a spring biases the link in a first direction and the link is moved in a second direction against a force of the spring on the link to position the latch in the retaining position and the link is pushed against the force of the spring on the link to position the latch in the release position. In at least some implementations, a second spring biases the latch to the retaining position, and rotation of the link in the first direction while the latch is engaged with the base causes relative rotation between the link and the latch.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
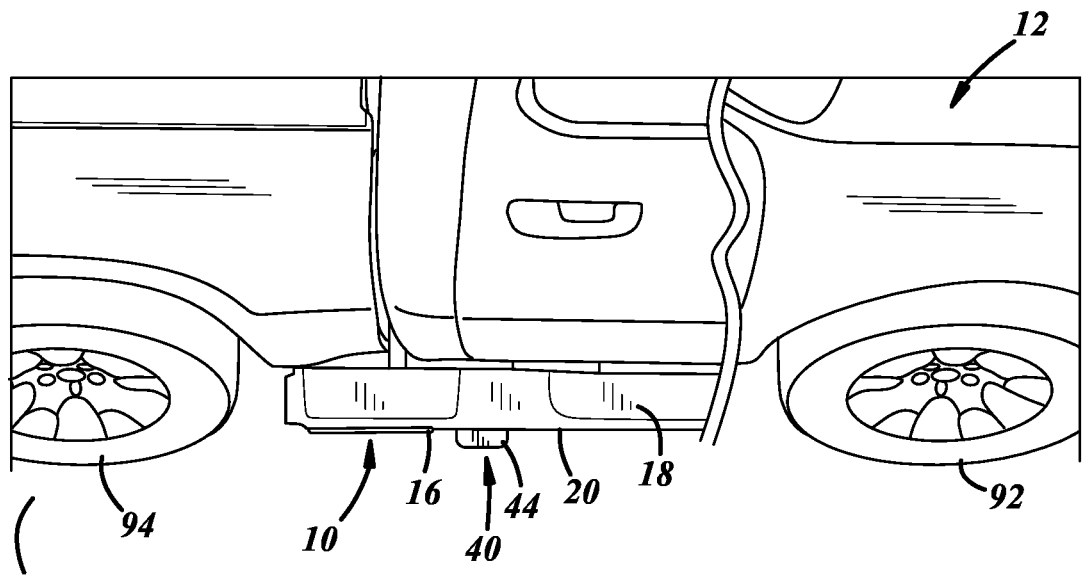
FIG. 1 is a fragmentary perspective view showing part of a side of a vehicle having a running board and a step, with the step shown in a retracted, stowed position.
Figure 2:
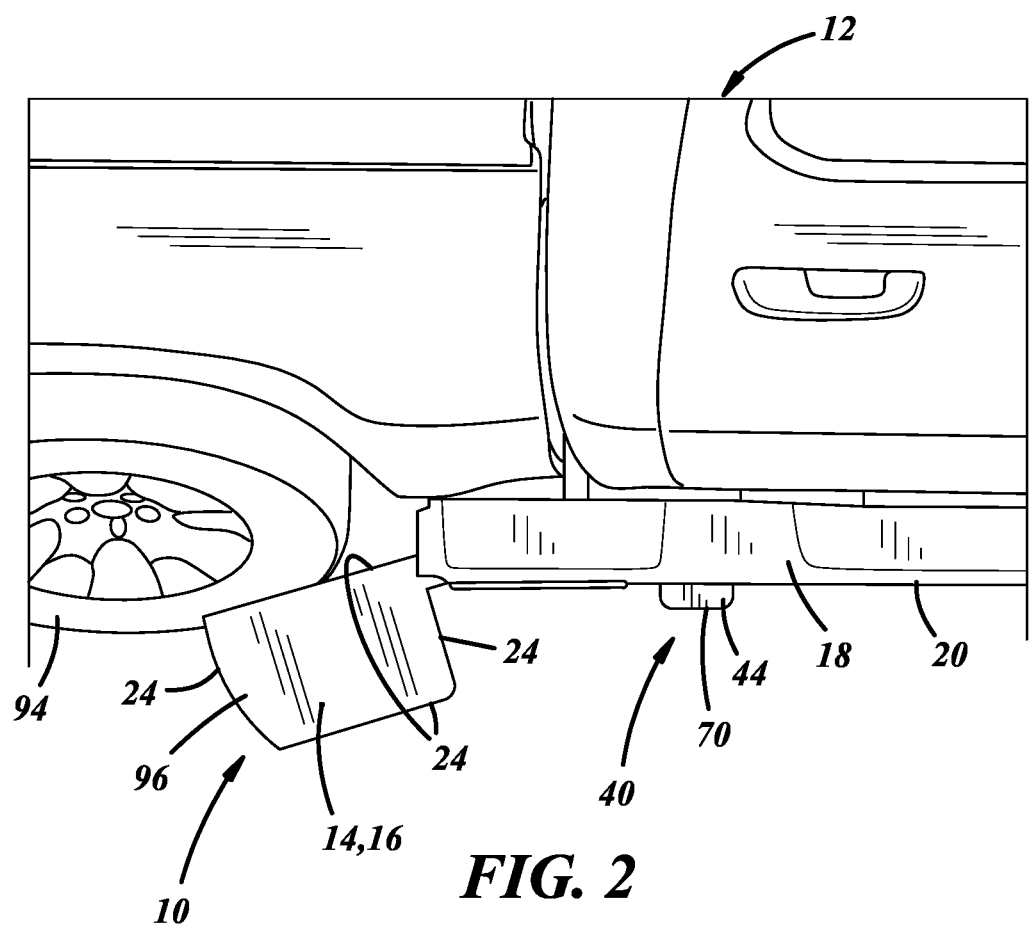
FIG. 2 is a view similar to FIG. 1 with the step in an extended position.

Referring in more detail to the drawings, FIGS. 1 and 2 show a step 10 for a vehicle 12 that moves or is movable between an extended or deployed position (FIG. 2), and a retracted or stowed position (FIG. 1). In the extended position, an upper surface 14 of a base 16 of the step 10 is exposed in a cross-car direction (which is a direction between left and right sides of the vehicle) outboard of the vehicle 12 so that a person may step up on the step 10 to facilitate access to, for example, a roof top carrier, bike mount, or the like, or to facilitate access to the bed of a pickup truck. In the retracted position, the step 10 may be received beneath part of the vehicle 12, which may include a component connected to the vehicle 12 like a fixed side step such as a rail/tube or running board 18, for example, which are typically received adjacent the passenger compartment of the vehicle 12. With a vehicle 12 having a side step or running board 18, the step 12 may extend outwardly beyond an end of the side step or running board 18, to provide better access to an area spaced from the passenger compartment, like a pickup truck bed. And the step 10 may be received beneath the side step or running board 18 when in the retracted position so that the step 10 does not extend outwardly beyond an outer edge 20 of the side step or running board 18, and the step 10 is out of the way when not in use.

In at least some implementations, the step 10 includes the base 16 having the upper surface 14 on which a user stands in use of the step 10. The upper surface 14 may be generally flat, and may be oriented upward, in the direction opposite to the direction of gravity, and may be perpendicular to the axis of rotation 22 (FIG. 3) of the step 10. The upper surface 14 may have any desired shape and may be sized for partial or full receipt of one foot or both feet of a user, as desired. The upper surface 14 may be defined by peripheral side surfaces 24 that extend between the upper surface 14 and a lower surface 26 (FIG. 5) that is opposite to the upper surface 14 and faces downwardly, toward the ground 28 (FIG. 1). The upper surface 14 may be wider in the cross-car direction between opposed side surfaces (labeled 24a, 24b in FIG. 5), than the running board 18.

As shown in FIGS. 3-8, the step 10 also includes a mount 30 adapted to be coupled to the vehicle 12. In the example shown, the mount 30 is connected to the running board 18 extending along the side of the vehicle 12 by a shaft or pivot pin 32 so that the base 16 of the step 10 rotates about the axis 22 defined by the mount 30 (or by the shaft/pivot pin 32) between the extended and retracted positions. The mount 30 may include a bracket 34 coupled to the base 16 or be defined by an integral extension 36 of the base 16, which is a portion extending laterally away from the base 16 and including a socket 38 for the pivot pin or shaft 32, or alternatively, including the pivot pin or shaft 32 which is received in a corresponding socket or bracket carried by/attached to the vehicle.

So arranged, the step 10 pivots or rotates about the axis 22 between the extended and retracted positions and the pin 32 rotates within the socket 38 and relative to the bracket 34. As the step 10 moves, the base 16 sweeps along a path of movement with the upper surface 14 remaining perpendicular to the axis of rotation 22 and generally parallel to a ground surface 28 on which the vehicle 12 is received.

In at least some implementations, the step 10 includes a retainer 40 that holds the step 10 in the retracted position when use of the step 10 is not needed. The retainer 40 may include a push-push mechanism that both is released and latched by pushing on part of the mechanism. Conveniently, the pushing action may be accomplished with a user's foot, to release the step 10 and permit the step to move to the extended position for use, and after use of the step, to then re-latch the retainer 40 to hold the step 12 in the retracted position. The step 10 may also include a second retainer 42 (FIGS. 5-8) that holds the step 10 in the extended position for increased stability of the step 10 and to reduce or prevent pivoted movement of the step 10 when in use in the extended position.

The first retainer 40 has a first position in which part of the retainer 40 overlaps the base 16 when the base is in the retracted position, to prevent rotation of the base to the extended position. And the first retainer 40 has a second position in which the first retainer does not overlap the base 16 in the path of rotation of the base, or otherwise permits the base to be released from the first retainer, so that the base is rotatable from the retracted position to the extended position wherein the upper surface 14 is exposed for use as a step.

Figure 3:
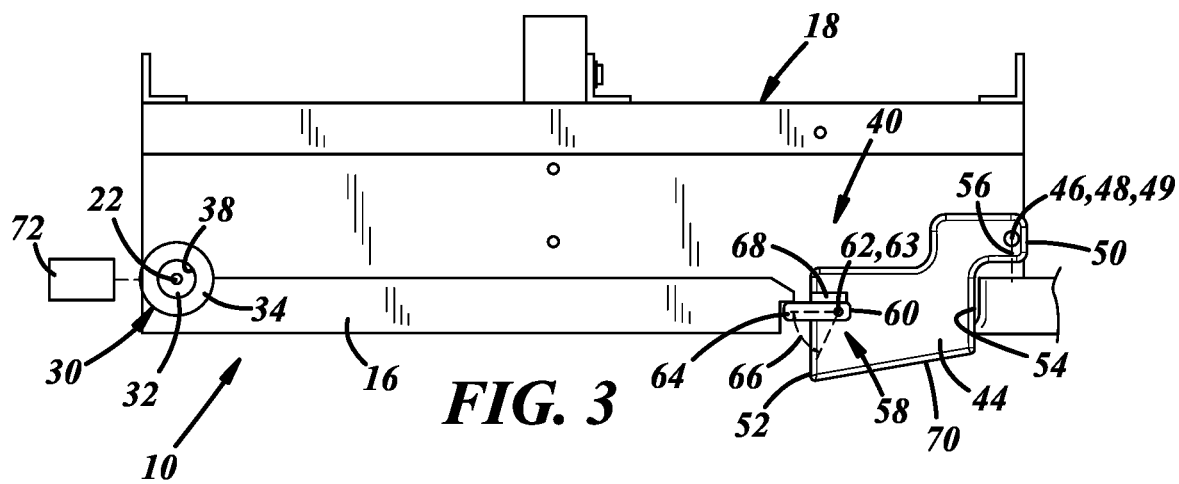
FIG. 3 is a bottom view of the retractable step showing a retainer that holds the step in the retracted position.
Figure 4:
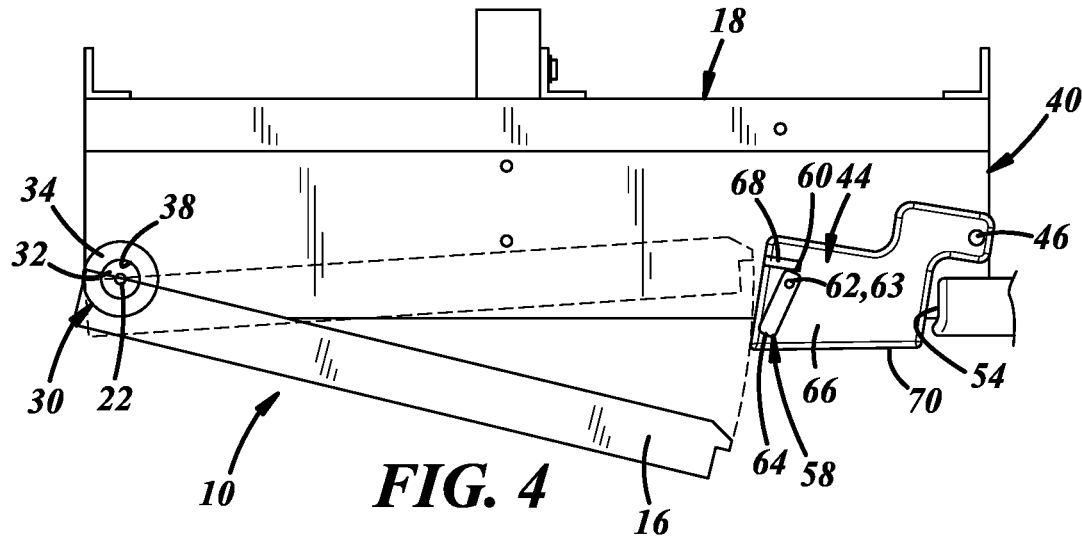
FIG. 4 is a view similar to FIG. 3, showing the step released from the retainer for movement to the extended position.

As shown in FIGS. 3 and 4, the first retainer 40 includes a link 44 having a pivot 46 such as may be defined by a pin or shaft 48 that couples the retainer to, for example, part of the vehicle 12. The link 44 rotates about the pivot 46 (e.g. the pivot 46 defines an axis of rotation 49 of the link 44), with the pivot shown as being adjacent to a first end 50 of the link 44, with a distal, second end 52 of the link 44 swinging about a circular path around the pivot 46. The link 44 is held in a retaining position by engagement of the link 44 with a stop surface 54 of the vehicle 12, which defines part of the first position of the first retainer 40. So that the link 44 is in this position by default, a spring 56 or other biasing member may yieldably bias the link 44 for rotation about the pivot 46 in a direction that causes the link 44 to contact the stop surface 54 (counterclockwise in the orientation shown in FIG. 3).

In at least some implementations, the retainer 40 includes a latch 58 that is coupled at a first end 60 to the link 44 by a pivot 62 which may be defined by a pin or the like, and which defines an axis of rotation 63 of the latch 58. The latch 58 has a free end 64 spaced from the first end 60 and which extends outwardly from the second end 52 of the link 44 and into the path of travel of the base 16 of the step 10, at least when the latch 58 is in a retaining position which defines part of the first position of the retainer 40, as shown in FIG. 3. So that the latch 58 is in this position by default, a second spring 66 or other biasing member may yieldably bias the latch 58 for rotation about the second pivot 62. In the implementations shown, the latch 58 is biased in a direction opposite to the direction of bias of the link 44 (which is clockwise in the orientation shown in FIG. 3). Thus, in the absence of a strong force acting on the latch 58, the free end 64 of the latch 58 extends outwardly from the link 44 and is in a position in which the latch 58 may engage the base 16 of the step 10. A second stop surface 68 may be provided to limit rotation of the latch 58 in the direction in which the latch 58 is biased, and the second stop surface 68 may be carried by or formed as part of the link 44, if desired.

In FIG. 4, the retainer 40 is shown in the second position in which the retainer 40 permits the step 10 to rotate away from the latch 58 and move to the extended position. In at least some implementations, the latch 58 is rotatable relative to the link 44 against the force of the second spring 66, and away from the retaining position shown in FIG. 3 to a release position, shown in FIG. 4. This may define part of the second position of the retainer 40, in which the retainer 40 permits the step 10 to rotate from the retracted position to the extended position.

In at least some implementations, the axis of rotation 63 of the latch 58 is between the axis of rotation 49 of the link 44 and the axis of rotation 22 of the step 10, and the latch 58 engages the base 16 between the pivot 46 of the link 44 and the axis of rotation 22 of the base 16. In at least some implementations, when the link 44 is rotated in a first direction the latch 58 rotates to the release position relative to the link 44 in a second direction opposite to the first direction. The link 44 may include an outer surface 70 that faces outward from the vehicle in the cross-car direction of the vehicle, and the outer surface 70 is accessible from outside the vehicle 12 so that the outer surface 70 may be engaged by a user (e.g. foot or hand) to push and rotate the link 44 inwardly toward the vehicle center (as shown in FIG. 4). This rotates the link 44 in the first direction, from the position the link 44 is in when the latch 58 is engaged with and retaining the step 10 in the retracted position. As shown in FIG. 3, when the retainer 40 is in the retaining position, the outer surface 70 of the link 44 may extend outwardly beyond an outer surface 20 of an adjacent portion of the vehicle 12 (which may include a component attached to the vehicle like a running board 18) so that the outer surface 70 of the link 44 is easier to access and actuate, if desired.

When the retainer 40 is in the retaining position, rotation of the link 44 relative to the step 10 provides a force on the latch 58 which is engaged with the base 16 of the step 10, and the latch 58 moves against the force of the second spring 66 away from the second stop surface 68 from a retaining position (FIG. 3) to a second, released position (FIG. 4) to permit the step 10 to rotate past the latch 58. That is, pushing the link 44 causes the latch 58 to rotate out of the path of movement of the base 16, to permit the step 10 to rotate to the extended position. In this position, the latch 58 does not overlap the base 16 and does not prevent movement of the base 16 toward the extended position. In the example shown, the first direction is clockwise, and the base 16 rotates in the first direction from the retracted position to the extended position, the link 44 rotates in the first direction to release the base (e.g. as the retainer 40 is moved from the retention position to the release position) and the latch 58 rotates in an opposite, second direction (e.g. counterclockwise) to release the base.

After the retainer 40 is moved to the second position and released from the step 10, the step 10 may rotate or be rotated to the extended position, shown in FIG. 2. The step 10 may be rotated by the user, by a spring or by a powered actuator 72 (FIG. 3), such as either a rotary or linear actuator. In this regard, the retainer 40 may be released by a user pushing the link 44, as earlier described, or by a powered actuator 72 which may move a single (e.g. a simple linear plunger or rotatable/pivoting latch) or multi-component retainer into and out of the path of movement of the step 10, to retain the step in the retracted position.

In at least some implementations, the second retainer 42 is provided to hold the step 1 in the extended position, and inhibit or prevent rotation of the step 10 relative to the vehicle 12 when the step is in the extended position. This improves the stability of the step 10 when a user is standing on the step.

Figure 5:
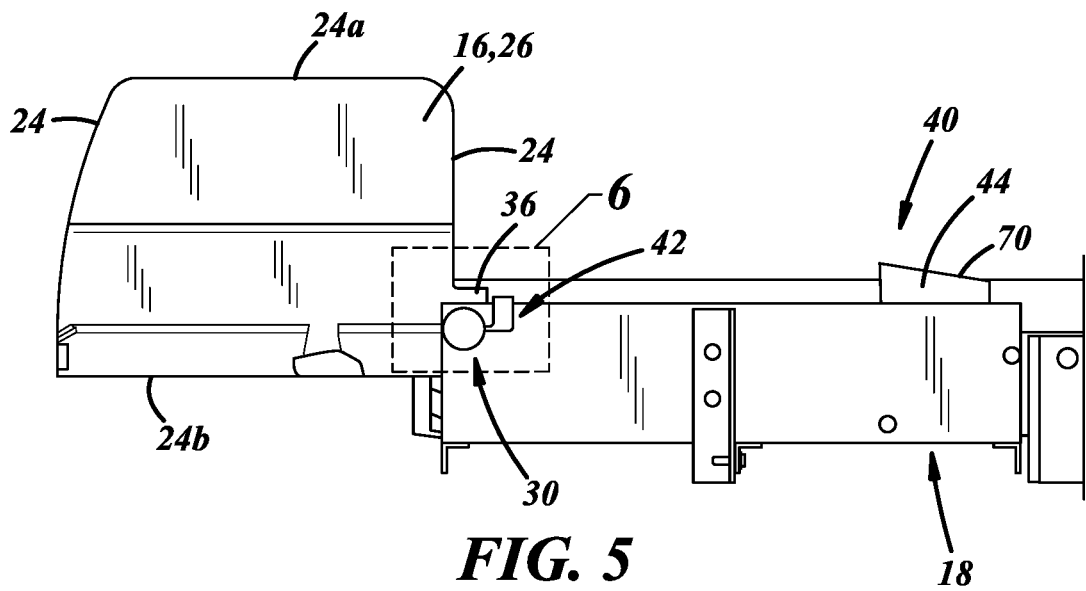
FIG. 5 is a bottom view of the step shown in the extended position.
Figure 6:
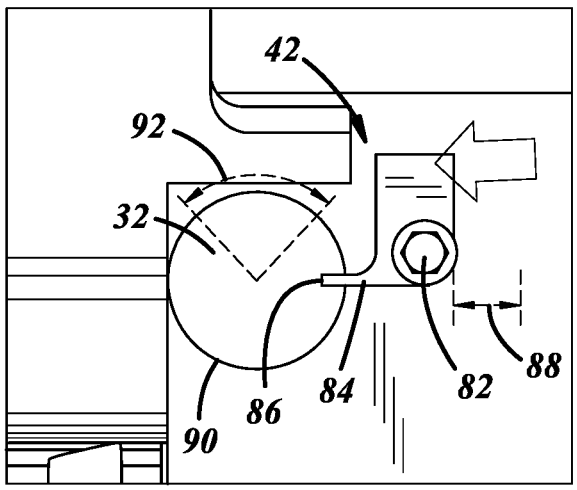
FIG. 6 is an enlarged fragmentary view of a second retainer that releasably holds the step in the extended position.
Figure 7:
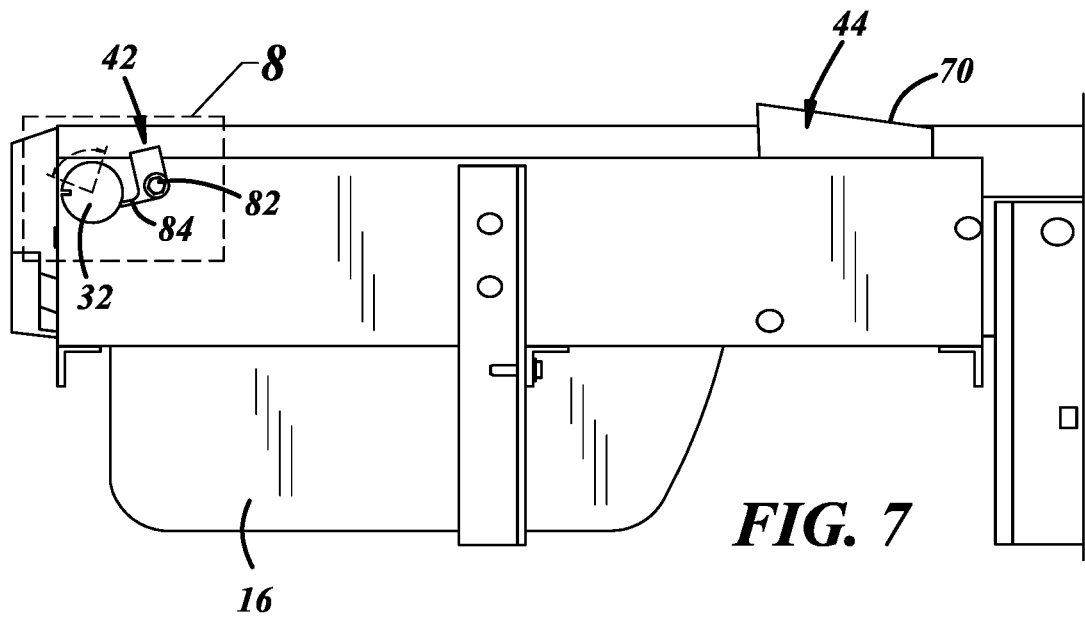
FIG. 7 is a bottom view of the step shown in the retracted position.
Figure 8:
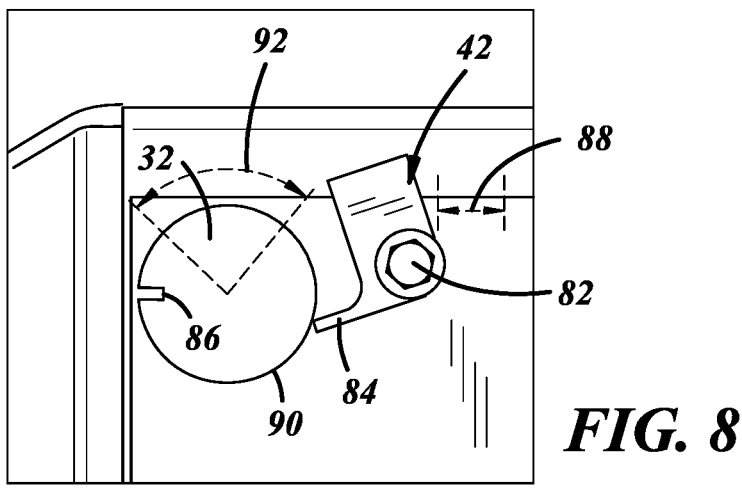
FIG. 8 is an enlarged fragmentary view of the second retainer when the step is in the retracted position.

FIGS. 5-8 show one implementation of a second retainer 42 that rotates about a pivot 82 (e.g. a pin or the like that defines an axis of rotation) between advanced and retracted positions. The second retainer 42 includes a finger 84 that is selectively engaged with part of the step 10, such as by being received within a void, which may be a slot 86, in part of the base 16 or the mount 30, where such part of the base or mount rotates when the step 10 rotates so that the slot 86 moves relative to the finger 84. In the example shown, the mount 30 includes or is defined by a cylindrical shaft 32 about which the step 10 rotates, and the slot 86 may be formed in the shaft 32, such as in an end that extends out of the socket 38, or within an opening or void in the bracket 34 that exposes the shaft 32 and slot 86. The second retainer 42 may be yieldably biased by a spring 88 toward the advanced position so that the finger 84 is engaged with an exterior surface 90 of the mount 30 to which the slot 86 is open. When the step 10 rotates to a position in which the slot 86 is aligned with the finger 84, the second retainer 42 rotates under the force of the spring 88 and the finger 84 is received within the slot 86, as shown in FIGS. 5 and 6. So arranged, the second retainer 42 inhibits or prevents rotation of the step 10 and holds the step 10 in the extended position. The slot 86 may be radially oriented, or within 30 degrees of radial, relative to the axis of rotation 22 of the step 10.

To release the finger 84 from the slot 86, the second retainer 42 may be manually released by rotating the second retainer 42 to remove the finger 84 from the slot 86, or the step 10 may be pushed farther in the first direction (e.g. farther away from the retracted position) until the slot 86 is sufficiently misaligned with the finger 84 and the finger is no longer within the slot 86, and then rotating the step 10 back toward the retracted position at a speed or rate that prevents the finger 84 from being received within the slot 86. Such rotation of the step 10 may be done by the user, by a spring 92 or other biasing mechanism that tends to rotate the step away from the extended position, or by a powered actuator, as desired. The second retainer 42 may be moved manually or by a powered actuator, as desired.

In at least some implementations, as shown in FIG. 1, the step 10 may be coupled to the vehicle 12 along a side of the vehicle and between front and rear wheels 92, 94 on a side of the vehicle. When in the retracted or stowed position, the step 10 may be received fully between the wheels 92, 94, with an outer edge of the base 16 even with or recessed inwardly from and overlapped by an outer edge of the vehicle 12, where that outer edge 20 may be defined by a component like a tube step or running board 18, or other component coupled to a main body 95 of the vehicle 12 which has a lower surface 97 facing toward and spaced from the ground or other surface on which the vehicle 12 is located. When extended, as shown in FIG. 2, the base 16 is partially or fully exposed and located outboard of the vehicle 12, and an end 96 of the step 10 spaced farthest from the mount 30 or axis of rotation 22, may be received outboard of an overlapping the rear wheel 94 (overlapping in a fore-aft direction defined between front and rear ends of the vehicle 12, perpendicular to the cross-car direction). This may facilitate access to a cargo area (labeled 102 in FIGS. 9 and 10) behind the passenger compartment, and adjacent to the rear wheel 94, and may facilitate a user stepping onto the rear wheel 94 if they desire to do so. Further, with the step 10 located outboard of the rear wheel 94, a user standing on the step 10 may be spaced from the side of the vehicle 12 farther than if the user were standing on the running board 18 or wheel 94. This may help the user stay out of contact with a side of the vehicle 12 to avoid scratching the vehicle (e.g. via buttons or the like on the user's clothing) and avoid dirt from the vehicle from being transferred to the user.

Figure 9:
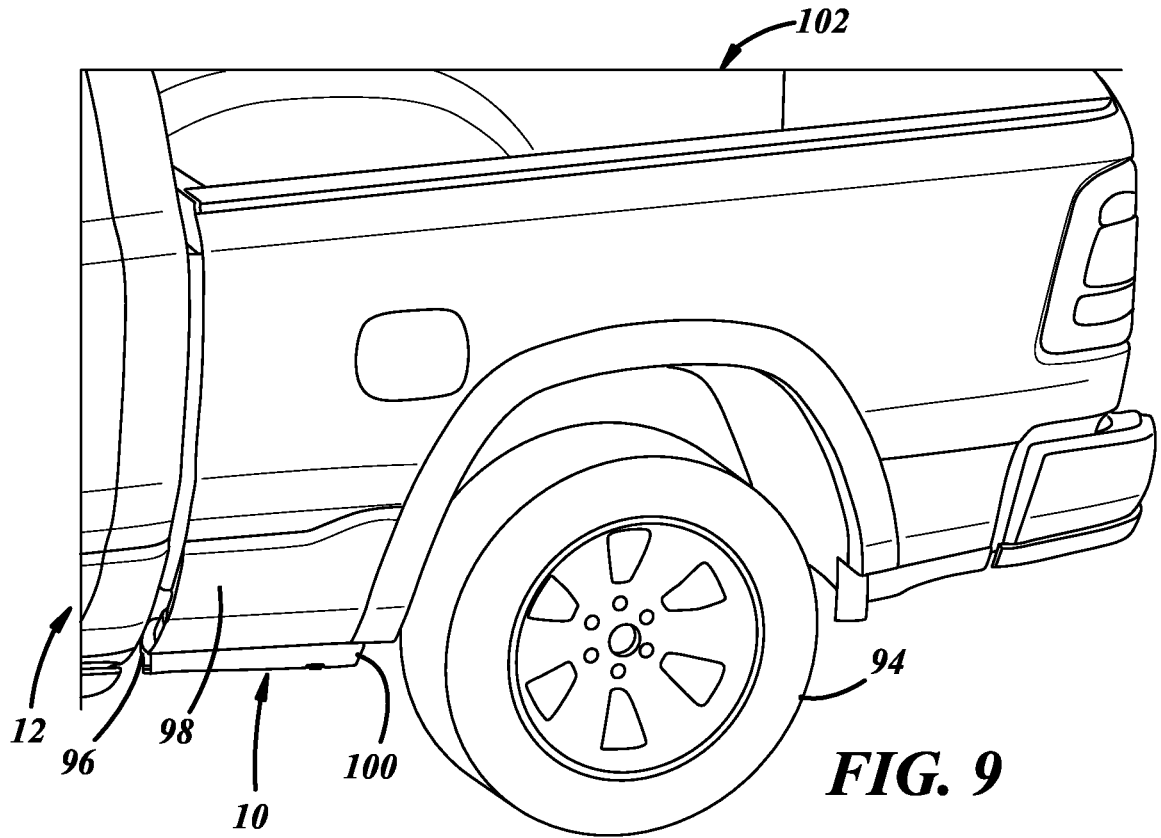
FIG. 9 is a fragmentary perspective view showing part of a side of a vehicle having a step, with the step shown in a retracted, stowed position beneath the vehicle.
Figure 10:
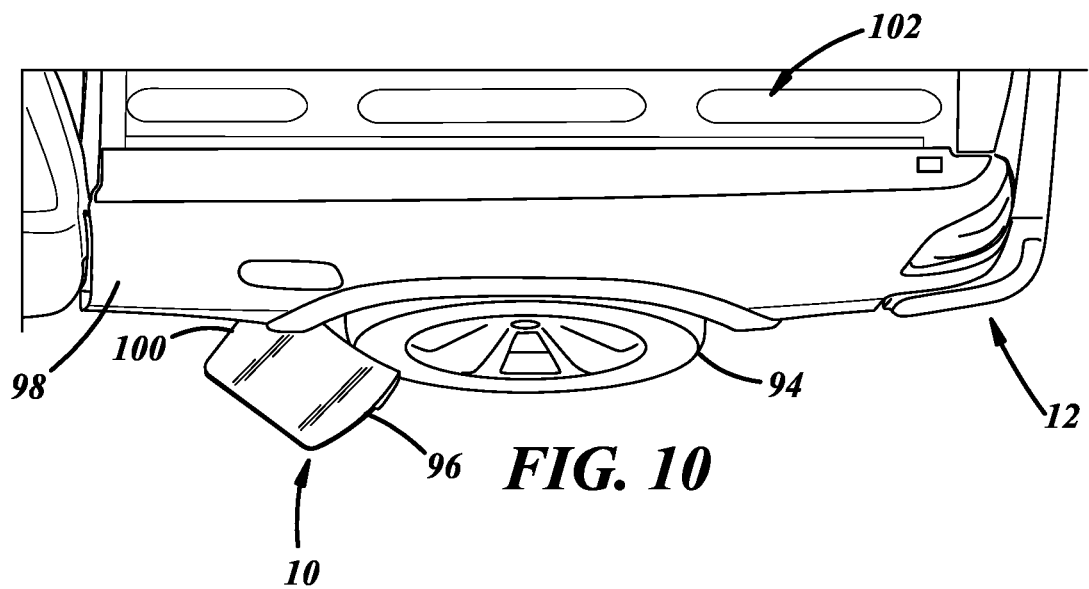
FIG. 10 is a view similar to FIG. 9 with the step in an extended position.

FIGS. 9 and 10 illustrate an embodiment of the step 10 wherein the mount 30 is coupled to an underside of the vehicle 12, and not a running board 18 or tube step or the like. The step 10 and related components like the first retainer 40 and second retainer 42 may be constructed in the same manner as previously described, and to facilitate description of the embodiments, the same reference numerals will be used to denote parts that may be the same as or similar to those previously described.

In the retracted position, shown in FIG. 9, the step 10 is received beneath the vehicle body 98 (e.g. beneath a lower surface 97 of the vehicle body), and in the extended position, shown in FIG. 10, most or all of the base 16 of the step 10 is outboard of the vehicle body 98 and may overlap a rear wheel 94 of the vehicle 10 in the fore-aft direction. The mount 30 may be located at an end 100 of the base 16 that is closest to the rear wheel 94 in the retracted position of the step 10, and the opposite end 96 of the base 16 may rotate toward the rear wheel 94 and may overlap the rear wheel in the fore-aft direction as noted. The remainder of the step 10 may be as described above, if desired, including but not limited to the retainer 40 to hold the step 10 in the retracted position and the second retainer 42 to hold the step in the extended position.

While shown as being connected to the vehicle along a side of the vehicle, a step as described may also be connected to the front or rear of the vehicle, as desired. For example, such a step may assist a user in accessing a front compartment of the vehicle (which may be an engine compartment) or a rear area of the vehicle, for example, to step up into the truck bed or to facilitate loading items into the truck bed from an elevated stance.

What is claimed is:

1. A movable step for a vehicle, comprising:
    a base having an upper surface and a mount adapted to be coupled to a vehicle and defining an axis of rotation of the base, wherein the axis of rotation is perpendicular to the upper surface of the base and the base rotates about the axis of rotation between an extended position and a retracted position;
    a retainer having a first position in which the retainer overlaps the base in a path of rotation of the base to prevent rotation of the base from the retracted position to the extended position, and the retainer has a second position in which the retainer does not overlap the base in the path of rotation of the base so that the base is rotatable from the retracted position to the extended position wherein the upper surface is exposed for use as a step, and which also includes a spring that yieldably biases the base toward the extended position.

2. The movable step of claim 1 wherein, when the base is in the retracted position, the base is received beneath part of the vehicle and the base does not extend outwardly beyond an outer edge of the vehicle or a component connected to the vehicle so that the upper surface is not exposed for use as a step.

3. A movable step for a vehicle, comprising:
    a base having an upper surface and a mount adapted to be coupled to a vehicle and defining an axis of rotation of the base, wherein the axis of rotation is perpendicular to the upper surface of the base and the base rotates about the axis of rotation between an extended position and a retracted position;
    a retainer having a first position in which the retainer overlaps the base in a path of rotation of the base to prevent rotation of the base from the retracted position to the extended position, and the retainer has a second position in which the retainer does not overlap the base in the path of rotation of the base so that the base is rotatable from the retracted position to the extended position wherein the upper surface is exposed for use as a step, wherein the retainer includes a link having a pivot about which the link rotates, and the retainer includes a latch that is coupled to the link by a pivot and which has a free end that extends outwardly from the link and into the path of travel of the base when the latch is in a retaining position and which rotates relative to the link and away from the retaining position to a release position to permit the base to rotate to the extended position.

4. The movable step of claim 3 wherein the latch engages the base between the pivot of the link and the axis of rotation of the base.

5. The movable step of claim 3 wherein the link is rotated in a first direction and the latch rotates to the release position relative to the link in a second direction opposite to the first direction.

6. The movable step of claim 5 which also includes a spring biasing the latch to the retaining position, and rotation of the link in the first direction while the latch is engaged with the base causes relative rotation between the link and the latch.

7. The movable step of claim 5 wherein the base rotates in the first direction from the retracted position to the extended position.

8. The movable step of claim 5 wherein rotation of the link in the second direction about the pivot is limited by engagement of the link with a stop surface, and wherein a spring yieldably biases the link into engagement with the stop surface.

9. The movable step of claim 5 which includes a second stop surface that is engaged by the latch in the retaining position.

10. A vehicle, including:
    a body having a lower surface facing toward and spaced from a surface on which the vehicle is located, and the body including a mount;
    a base connected to the mount to couple the base to the vehicle, the mount defining an axis of rotation of the base about which the base rotates in a path of movement between a retracted position and an extended position, the base having an upper surface facing away from the surface on which the vehicle is located; and
    a retainer having a link coupled to the vehicle at a first pivot to permit pivoted motion of the link, the retainer including a latch coupled to the link and movable relative to the link between a retaining position in which the latch overlaps the path of rotation of the base, and a release position in which the latch does not overlap the path of rotation of the base so that the base is rotatable from the retracted position to the extended position wherein at least part of the upper surface is located outwardly of the lower surface and is not directly between the lower surface and the surface on which the vehicle is located.

11. The vehicle of claim 10 wherein along a side of the vehicle the vehicle has a front wheel and a rear wheel spaced apart in a fore-aft direction, the base does not overlap the rear wheel in the fore-aft direction when the base is in the retracted position and the base does overlap the rear wheel in the fore-aft direction when the base is in the extended position.

12. The vehicle of claim 10 wherein the axis of rotation of the base is perpendicular to the surface on which the vehicle is located.

13. The vehicle of claim 10 wherein the vehicle includes opposite sides spaced apart in a cross-car direction, and wherein the body having the lower surface includes a fixed side step that is connected to and extends outwardly in the cross-car direction from one of the sides of the vehicle, and wherein the base does not extend outwardly in the cross-car direction from the fixed side step when the base is in the retracted position and the base does extend outwardly from the fixed side step in the cross-car direction when the base is in the extended position.

14. The vehicle of claim 10 wherein a spring biases the link in a first direction and the link is moved in a second direction against a force of the spring on the link to position the latch in the retaining position and the link is pushed against the force of the spring on the link to position the latch in the release position.

15. The vehicle of claim 14 which also includes a second spring biasing the latch to the retaining position, and rotation of the link in the first direction while the latch is engaged with the base causes relative rotation between the link and the latch.

* * * * *